United States Patent Office 3,189,571
Patented June 15, 1965

3,189,571
STABILIZATION OF ACRYLONITRILE POLYMERS WITH VIC-EPOXY COMPOUNDS
James S. Pavlin, Fitchburg, and Arnold B. Finestone, Leominster, Mass., assignors to Foster Grant Co., Inc., Leominster, Mass., a corporation of Delaware
No Drawing. Filed Oct. 7, 1960, Ser. No. 61,096
7 Claims. (Cl. 260—23)

This invention relates generally to stabilized copolymers of vinyl aryl compounds and acrylonitrile. More particularly this invention relates to new and improved thermoplastic polymeric compositions consisting of from about 65% to about 80% by weight of vinyl aryl compounds and from about 35% to 20% by weight of acrylonitrile having incorporated therein as stabilizing agent at least one epoxidized organic composition.

The polymeric compositions of this invention are known as "solvent-resistant" resins, viz. resins that are relatively resistant to attack by such liquids as gasoline, alcohol, water, aqueous acids and aqueous bases, even though they are swellable and/or dispersible in such liquids as methyl ethyl ketone. As molding compositions, they are readily moldable to clear and substantially non-discolored products by conventional means such as by compression or injection molding, hot pressing, extrusion or the like.

Thermoplastic resinous compositions of from about 65% to 80% by weight of vinyl aryl compounds and from about 35 to 20% by weight of acrylonitrile are known. These copolymers, which form the basis of the present invention, have average molecular weights such that 10% by weight solutions of the copolymers in methyl ethyl ketone have viscosities between 6 and 40, preferably between 10 and 30, centipoises at a temperature of 25° C. The copolymers usually possess the most desirable combination of mechanical properties, viz. strength, hardness, flexibility, and molding behavior, viz., flow rate, which combination of mechanical properties and molding behavior is related to the average molecular weight of the copolymers.

Several methods of preparing such thermoplastic resinous compositions are known to the art. For example, bulk, solution, suspension and emulsion polymerization techniques have been employed.

Both thermal bulk polymerization and thermal solution polymerization of styrene and acrylonitrile may be carried out at temperatures ranging from about 60° C. to about 180° C. under pressure. When thermal solution polymerization techniques are employed, hydrocarbon diluents such as benzene, ethylbenzene or the like are used, and such a polymerization process usually requires elaborate equipment to control the reaction and to remove unreacted monomers and/or diluents. In such a polymerization it has been found advantageous to avoid the use of organic catalysts because of their effect on the acceleration of the reaction rate thus increasing the potential for an uncontrollably strong exothermic or "runaway" polymer reaction.

Also known in the art is the polymerization of styrene and acrylonitrile in the presence of an emulsifying agent. Products thereby produced have not received commercial acceptance because of the great difficulty in obtaining a clear and non-discolored product. In emulsion polymerization systems, it is necessary to take precautions to control the ultimate molecular weight of the final product, and because of the high water solubility of acrylonitrile, it is extremely difficult to obtain a uniform product. In general, a higher percentage of acrylonitrile than that required in the copolymerization is usually charged to a reactor in order to compensate for the solubility of the monomer in water. Ordinarily, emulsion systems are catalyzed by water soluble peroxy compounds, in amounts from 0.001 to 1.0% of the polymerizable monomer. Examples are, hydrogen peroxide, sodium peroxide, the sodium salts of other peroxy acids, the potassium, ammonium and other water soluble salts of the above or other peroxy acids and other water soluble compounds containing a peroxy group (—O—O—) which can generate radicals. The uniform distribution of the reagents in the reaction mass can be accomplished by agitation or by the use of wetting agents or emulsion stabilizers.

Commonly used wetting agents or emulsion stabilizers include the water soluble or dispersible salts of fatty acids, such as sodium oleate and potassium stearate, mixtures of water soluble fatty acid salts, such as the common soaps prepared by the saponification of animal and vegetable oils, the "amino" soaps such as triethanol amine and dodecyl methyl amine, sulfonated hydrocarbons such as alkyl aryl sulfonate and others. The quantity of emulsifying agent usually will depend upon the particular agent selected, the ratio of water and monomer to be used, and other conditions of polymerization. In general, however, from 0.5 to 5% by weight of the monomer, may be employed.

It is also known in the art that the polymerization of styrene an acrylonitrile can be carried out in aqueous suspension, i.e. in the presence of a suspending agent, and that the products thereby made also have not received commerical acceptance because of the great difficulty in producing non-discolored uniform products. With respect to suspension polymerization, a relatively clear product can be obtained because of the ease with which the suspending agent is removed, but the product is unfavorably limited by the color produced. Again, as with the emulsion system, a greater concentration of acrylonitrile must be charged to a reactor in order to compensate for the solubility of the acrylonitrile in water.

Normally, suspension polymerization is accomplished at temperatures varying between 70° C. and 130° C. and preferably between 75° C. and 120° C. in the presence of a catalyst and a dispersing or suspending agent. It is well known that peroxides such as benzoyl peroxide, acetyl peroxide, tertiary butyl hydroperoxide and diazo compounds such as azo-bis-isobutyrylnitrile can be used as catalysts in the polymerization of styrene type compounds with acrylonitrile. Commonly used suspending agents include calcium hydroxyapatite, tricalcium phosphate, talc, polyacrylamide, methyl cellulose, methyl starch, glycol cellulose, polyvinyl alcohol, styrene-maleic acid copolymers, etc.

It is difficult to prepare consistently good polymeric products in the foregoing proportions which are readily moldable to clear and non-discolored products and which have satisfactory mechanical and molding behavior. The reasons, therefore, are quite evident. That the copolymerization reaction, in which copolymers in the foregoing proportions are formed, is vigorously exothermic is well known as are the facts that the rate of polymerization reactions increases with an increase in reaction temperature and that the average molecular weight of the copolymer product usually decreases with such increase in reaction temperature. At temperatures at which the copolymerization is readily controlled, the rate of production of the copolymer is undesirably slow and the molecular weight of the copolymer is undesirably high. On the other hand, polymerization at temperatures calculated to give desirable average molecular weight results in a reaction rate so great as to make its control difficult.

In general, therefore, raising the temperature at which suspension polymerization is carried out for the purpose of lowering the molecular weight of the product is usually undesirable since it involves a considerable increase in the rate of reaction and may result in either or both an uncontrollably strongly exothermic or "runaway" polymer reaction and discoloration of the polymeric product by overheating.

The foregoing suspension system difficulties have been solved to some extent by polymerizing styrene and acrylonitrile, in the above mentioned proportions, in aqueous suspension at relatively low temperatures, viz. 60° C. to 125° C., and more preferably between 65° C. and 90° C., utilizing in combination a water insoluble aliphatic peroxide catalyst having the general formula

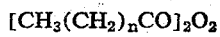

$$[CH_3(CH_2)_nCO]_2O_2$$

wherein $n$ is an integer greater than two, preferably an integer from 6 to 16, such a catalyst being exemplified by caprylyl, octanoyl, lauroyl, myristyl and stearyl peroxide and a third comonomer of the monovinyl aromatic type, i.e., alpha-methylstyrene. The styrene acrylonitrile polymers thus prepared in the presence of the aforementioned insoluble aliphatic peroxide catalyst and the monovinyl compound such as alpha-methylstyrene have relatively high uniformity, relatively good color, and relatively good color stability and do not appreciably discolor and are readily moldable to substantially clear and non-discolored shaped products by conventional means, as more fully disclosed and claimed in our co-pending U.S. application Serial No. 21,146, filed April 11, 1960.

More specifically, as disclosed in our co-pending application, desirable polymeric compositions consisting essentially of from about 65% to 80% by weight of styrene and alpha-methylstyrene and from about 35% to about 20% by weight of acrylonitrile can be produced by suspension polymerization in the presence of a catalyst of the aforementioned type, the comonomer alpha-methylstyrene being present in the proportion of from about 5 to 35% of the total amount of the monomers. The percentage of alpha-methylstyrene may be somewhat reduced in some cases, by incorporation in the system of a chain transfer agent, i.e., mercaptan, aliphatic halogenated compounds, aromatic hydrocarbons, unsaturated dimers of monomeric alpha-alkyl aromatic compounds, i.e., the dimer of alpha-methylstyrene, etc.

Preparation of the polymer by suspension polymerization in accordance with our aforementioned application is carried out by copolymerizing a monomer charge consisting of 20 to 35 parts of acrylonitrile, 2 to 10 parts acrylonitrile in excess, and from 80 to 65 parts of styrene and alpha-methylstyrene in an aqueous suspension at temperatures between preferably about 65° C. and about 90° C. in the presence of a water insoluble aliphatic peroxide catalyst as described above. The catalyst is present in the aqueous suspension polymerization in amounts of from about 0.02% to 2.0%, and preferably between 0.1 to 1.6% by weight of the combined weight of the monomers charged. Most efficient polymerization is achieved by controlling polymerization so that it may be stopped at a conversion in the range of from 60 to 92% preferably between 65 to 85%.

When thermal bulk polymerization techniques are employed, conversion is stopped within a range of about 40 to 90% while in conventional emulsion polymerization systems about 60 to 92% conversion is affected. In all methods of polymerization, if polymerization is carried beyond the desirable limit, a non-uniform copolymer will be produced probably since long units of acrylonitrile in the chain are sites of thermal discoloration either by an intermolecular reaction or by an intramolecular cyclization. Moreover, it is generally known that at high conversions acrylonitrile in the copolymer has a tendency to crosslink and gel with attendant disadvantages to the product.

While the method of preparing polymeric compositions consisting essentially of vinyl aryl or styrene compounds and acrylonitrile by the above specific suspension polymerization procedure has succeeded in producing copolymer products which are clear and readily moldable to substantially clear and non-discolored products, we have found that these products can be substantially improved in these respects by the incorporation therein of an epoxidized composition or mixtures of two or more of these materials.

More specifically we have now found that the incorporation of an epoxidized organic composition in polymeric compositions consisting of from about 65% to about 80% by weight of vinyl aryl compounds and from about 35% to 20% by weight of acrylonitrile, and having the previously recited average molecular weights, improves the stability of the polymeric compositions most unexpectedly regardless of process, i.e., bulk, solution, emulsion or suspension, employed. Molding of these polymeric compositions at relatively high temperatures does not result in loss of clarity but unexpectedly in production of substantially non-discolored products.

Epoxidized compositions which can be used to advantage in our invention are of three types. First are resinous complex mixtures of polyglycidyl ethers which are the products of the reaction of an epihalohydrin such as epichloro- or epibromohydrin and polyfunctional phenols or polyfunctional aliphatic alcohols in the presence of certain alkaline catalysts. In the preparation of these resins the moles of epihalohydrin to be reacted per mole of polyfunctional hydroxy compound may be varied from about 4 down to 1 depending upon the functionality of the polyhydroxy compound employed.

Polyhydric phenols which have been found particularly suitable in preparing epoxy resins useful in this invention are the reaction products of phenol and aliphatic ketones, including polynuclear phenols wherein the phenol nuclei are joined by carbon bridges such as p,p¹ dihydroxydiphenyl dimethyl methane, p,p¹ dihydroxydiphenyl methane, tris (p-hydroxyphenyl)methane, and 2,2,5,5-tetra-(parahydroxyphenyl)hexane, etc. Examples of additional polynuclear phenols are those in which the phenol nuclei are joined by other than carbon bridges such as bis(p-hydroxyphenyl)sulfone, etc.

Suitable polyhydric alcohols used in preparing the present epoxy resins include glycerol, propylene glycol, 1,4-butanediol, pentaerythritol, etc.

The second type of epoxidized compositions suitable for use in our invention are those epoxy oils resulting from the epoxidation of such well known natural products as unsaturated oils which are glycerides resulting from the esterification of trihydric alcohol glycerol with higher and middle fatty acids, i.e., plant oils, olive oil, rape oil, almond oil, peanut oil, palm oil, and soybean oil, etc. Oils of the terpene series such as bornylene, camphene, carene, dipentene, fenchene, limonene, pinene, terpinene, etc., may also be epoxidized and are suitable for use in this invention. Well known epoxidizing agents such as peracetic acid may be employed to form these epoxidized compositions. The natural products are preferably substantially epoxidized so as to yield the highest oxirane concentration possible in each molecule.

The third type of epoxidized compositions which we have found to be suitable for use in the present invention are the low molecular weight materials obtained from the epoxidation of cycloaliphatic compounds. Examples of useful products include dicyclopentadiene dioxide, di(isodecyl)4,5-epoxycyclohexane-1,2-dicarboxylic, 3,4-epoxy-6-methyl-cyclohexyl-methyl-3,4-epoxy-6-methylcyclohexanecarboxylic, di(2-ethylhexyl)4,5-epoxycyclohexane-1,2-dicarboxylate, etc. The oxirane oxygen content of these materials preferably is high and is obtained by substantially complete epoxidation of the double bonded carbons in the molecules. It is desirable, when using the second and third types of epoxidized compositions that the oxirane content be as high as possible and since low molecular weight epoxy compounds are high in oxirane oxygen content they are preferred.

The additive employed in this invention is most advantageously incorporated in the vinyl aryl and acrylonitrile material prior to the polymerization thereof. However, it may be added during or after the polymerization.

The epoxidized composition is usually used in amounts ranging from about 0.005 to 0.75% by weight of the initial monomers employed with from about 0.01 to 0.5% by weight being preferred. The concentration of the epoxidized composition varies within the broad range specified depending on the particular oxirane content of the molecule in the specific epoxy employed.

The vinyl aryl, i.e., styrene type compounds which can be used in preparing the copolymers of our invention are those compounds represented by the following formula:

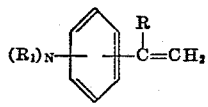

wherein R is selected from the group consisting of hydrogen and the methyl radical, $R_1$ is a substituent selected from the group consisting of chlorine and lower alkyl radicals and $n$ is an integer between 0 and 2. Included are styrene per se, nuclear substituted alkyl styrenes, e.g., o-, m- and p-methyl styrene, 2-4 dimethylstyrene and the like, alpha and beta alkyl substituted styrenes, e.g., alpha-methylstyrene and the like. Mixtures of styrene compounds may also be employed, i.e., a mixture of styrene and alpha-methylstyrene as set forth above.

In place of acrylonitrile, methyl substituted acrylonitrile may be employed to advantage in preparing the compositions of this invention.

A scale of color index numbers for visually comparing the polymeric materials of this invention with each other and with polymers made by the same methods but not incorporating the additives herein disclosed has been devised. Molded examples for comparative purposes were prepared by pressing polymer beads into plaques at 370° F. and 450° F., respectively, for 10 minutes. The scale in which the number is related to its adjacent color is as follows:

1. Water white
2. White
4. Very slightly yellow
6. Slightly yellow
8. Yellow
10. Very yellow
13. Dark yellow
20. Brown
>20. Dark brown The following examples illustrate the invention, but are not to be construed as limiting. In these examples parts are by weight, unless otherwise specified.

*Example 1*

To a suitable pressure reaction vessel containing 200 parts of distilled water are added 50 parts of styrene monomer, 15 parts of alpha-methylstyrene monomer, 35 parts of acrylonitrile, 1.4 parts of lauroyl peroxide. The monomer mixture is polymerized at a temperature of 80° C. in an inert atmosphere under autogeneous pressure. Calcium hydroxyapatite precipitated by a reaction between the required amounts of trisodium is controlled by removal of the unreacted monomer through steam distillation. Upon completion of the polymerization, the polymer beads are thoroughly washed with water and dried in an air drier at 70° C. to 80° C. In the final copolymer there is 25.5% of combined acrylonitrile, by weight of the copolymer. The polymer so formed has a viscosity of 16.2 centipoises when measured as a 10% by weight solution in methyl ethyl ketone at 25° C.

A portion of the polymer beads is pressed into a plaque at 370° F. and held at that temperature for 10 minutes. The color index number is 7. Another portion of the beads is pressed into a plaque at 450° F. and held at that temperature for 10 minutes. The color index number of the molded plaque is 14.

*Example 2*

Example 1 is repeated substituting benzoyl peroxide for the lauroyl peroxide.

Employing the test molding conditions of Example 1 on the resultant product, the color index number of the test plaques molded at 370° F. and 450° F. is greater than 20.

*Example 3*

Example 1 is repeated with the addition before polymerization of 0.1 part of Epon 828, a Shell Company polymer of epichlorohydrin and bis phenol A having an average molecular weight of 390 grams and an epoxy equivalency of 0.54/100 grams. Employing the molding conditions of Example 1 on the resultant product, the color index of the plaque molded at 370° F. is 4 and the plaque molded at 450° F. has a color index of 8.

*Example 4*

Example 1 is repeated with the addition before polymerization of 0.01 part of Flexol E.P.O., a substantially epoxidized soybean oil having an average viscosity of 536 centipoises at 20° C. Employing the molding conditions of Example 1 on the resultant product, the color index number of the plaque molded at 370° F. is 5 and the plaque molded at 450° F. has a color index number of 11.

*Example 5*

Example 2 is repeated with the addition before polymerization of 0.1 part of the Epon 828 of Example 3. Employing the molding conditions of Example 1 on the resultant product, the color index number of the plaque at 370° F. is 12 and the plaque molded at 450° F. has a color index number greater than 20.

*Example 6*

To a suitable reaction vessel containing 200 parts of distilled water are added 65 parts of styrene monomer, and 35 parts of acrylonitrile. An alkyl benzene sulfonate having an average of 24 carbon atoms per molecule is employed as the emulsifying agent and 0.2 gram of potassium persulfate is employed as catalyst. The mixture is polymerized in emulsion with constant agitation at 45° C. until approximately 85% conversion is obtained. The polymeric material is coagulate, washed with warm water and evaluated for color as in Example 1. The color index number of the plaque molded at 370° F. is 15 and the color index number of the plaque molded at 450° F. is greater than 20.

*Example 7*

Example 6 is repeated with the addition before polymerization of 0.5 part of substantially epoxidized dicyclopentadiene. Employing the molding conditions of Example 1 on the resultant product, the color index number of the test plaque molded at 370° F. is 9 and the test plaque molded at 450° F. has a color index number of 15.

*Example 8*

To a conventional prebodying pot or still is charged 71 parts of styrene monomer and 29 parts of acrylonitrile. The polymerization is carried out in the presence of 0.1 part of a suitable chain transfer agent at a temperature of 125° C. in an inert atmosphere for a period of 4 to 6 hours until a conversion of 70% is achieved, the polymerization is interrupted and the unreacted monomer is removed and the polymer cooled. Employing the molding conditions of Example 1 on the resultant product, the color index number of the test plaque molded at 370° F. is 5 and the plaque molded at 450° F. has a color index number of 11.

*Example 9*

Example 8 is repeated with the addition before polymerization of 0.5 part of the Epon 828 of Example 3. Employing the molding conditions of Example 1 on the resultant product the color index number of the plaque molded at 370° F. is 2 to 3 and the color index number of the plaque molded at 450° F. is 7.

When styrene alone or other vinyl aryl compounds or mixtures thereof in amounts of 65 to 80% by weight to 35 to 20% by weight of acrylonitrile are employed in the above examples similar advantageous results are obtained.

From the foregoing it will be obvious that the use of epoxidized compositions in the preparation of vinyl aryl and acrylonitrile copolymers by any method results in molding compositions not readily susceptible to discoloration under conventional molding conditions.

Many changes and alterations may be made without departing from the spirit and scope of this invention which is set forth in the appended claims which are to be construed as broadly as possible in view of the prior art.

We claim:

1. A method of producing a thermoplastic acrylonitrile-monovinyl aryl copolymer composition which is capable of being conventionally molded to clear and substantially non-discolored uniform copolymer parts, said method comprises polymerization of a monomer mixture of from about 65 to about 80% by weight of a polymerizable monovinyl aryl compound and about 35 to about 20% by weight of acrylonitrile in the presence of and in contact with about 0.005 to about 0.75% by weight, based on the monomer mixture, of an epoxy stabilizing agent selected from the group consisting of (a) resinous reaction products of from 1 to 4 moles of an epihalohydrin and one mole of a member selected from the group consisting of polyhydric phenols and polyhydric aliphatic alcohols; (b) oils resulting from the epoxidation of a member selected from the group consisting of (1) a glyceride reaction product of a fatty acid and glycerol and (2) a terpene oil; and (c) low molecular weight epoxy cycloaliphatic compounds other than an epoxidized terpene oil, said cycloaliphatic compounds being free of vic-epoxy reactive substituents which interfere with the desired stabilization.

2. A polymerization method of claim 1 wherein styrene is employed as a monovinyl aryl compound.

3. A polymerization method of claim 1 wherein the epoxy stabilizing agent employed is a resinous reaction product of from 1 to 4 moles of an epihalohydrin and one mole of a member selected from the group consisting of polyhydric phenols and polyhydric aliphatic alcohols.

4. A polymerization method of claim 1 wherein the epoxy stabilizing agent is an epoxidation oil as defined therein.

5. A polymerization method of claim 1 wherein the epoxy stabilizing agent is a low molecular weight epoxy cycloaliphatic compound other than an epoxidized terpene oil.

6. A method of claim 1 characterized by being an aqueous suspension polymerization.

7. A method of claim 1 wherein a monomer mixture of from about 30% to about 75% by weight of styrene, about 5% to about 35% by weight of alpha-methylstyrene and about 35 to about 20% by weight of acrylonitrile, is employed.

References Cited by the Examiner

UNITED STATES PATENTS

| | | | |
|---|---|---|---|
| 2,779,771 | 1/57 | Phillips et al. | 260—45.8 |
| 2,804,444 | 4/57 | Segro et al. | 260—45.7 |
| 2,811,505 | 10/57 | Schulken et al. | 260—45.8 |
| 2,889,308 | 6/59 | Fedderson | 260—23 |
| 2,898,348 | 8/59 | Swern et al. | 260—23 |
| 2,949,474 | 8/60 | Murdoch et al. | 260—45.8 |
| 2,963,455 | 12/60 | Rowland et al. | 260—45.8 |

LEON J. BERCOVITZ, *Primary Exmainer.*

A. D. SULLIVAN, *Examiner.*